(12) United States Patent
Schwander

(10) Patent No.: US 9,106,145 B2
(45) Date of Patent: Aug. 11, 2015

(54) DC-DC CONVERTER FOR ELECTRIC POWER USING A DC ELECTRIC POWER SOURCE

(75) Inventor: Denis Schwander, Labarthe sur Leze (FR)

(73) Assignee: Centre National D'Etudes Spatiales, Paris (FR)

( * ) Notice: Subject to any disclaimer, the term of this patent is extended or adjusted under 35 U.S.C. 154(b) by 341 days.

(21) Appl. No.: 13/511,981

(22) PCT Filed: Nov. 24, 2010

(86) PCT No.: PCT/FR2010/052510
§ 371 (c)(1),
(2), (4) Date: Aug. 10, 2012

(87) PCT Pub. No.: WO2011/067513
PCT Pub. Date: Jun. 9, 2011

(65) Prior Publication Data
US 2012/0307527 A1 Dec. 6, 2012

(30) Foreign Application Priority Data
Nov. 26, 2009 (FR) ...................... 09 58393

(51) Int. Cl.
*H02M 3/335* (2006.01)

(52) U.S. Cl.
CPC ...... *H02M 3/33553* (2013.01); *H02M 3/33569* (2013.01)

(58) Field of Classification Search
USPC ........... 363/15, 16, 17, 61, 81, 125, 126, 127; 33/15, 16, 17, 61, 81, 125, 126, 127
See application file for complete search history.

(56) References Cited

U.S. PATENT DOCUMENTS

| | | | |
|---|---|---|---|
| 5,539,630 A | 7/1996 | Pietkiewicz et al. | |
| 6,256,213 B1* | 7/2001 | Illingworth | 363/89 |
| 6,449,176 B1* | 9/2002 | Kakuda | 363/91 |
| 6,483,731 B1* | 11/2002 | Isurin et al. | 363/125 |
| 6,574,125 B2* | 6/2003 | Matsukawa et al. | 363/71 |
| 6,934,167 B2* | 8/2005 | Jang et al. | 363/21.02 |
| 7,675,761 B2* | 3/2010 | Cuadra et al. | 363/21.12 |
| 2005/0099827 A1* | 5/2005 | Sase et al. | 363/16 |
| 2010/0142240 A1* | 6/2010 | Lee et al. | 363/132 |

FOREIGN PATENT DOCUMENTS

| | | |
|---|---|---|
| DE | 102006022845 A1 | 12/2006 |
| EP | 0019096 A1 | 11/1980 |
| EP | 1406373 A2 | 4/2004 |
| WO | 9314557 A1 | 7/1993 |

OTHER PUBLICATIONS

International search report for international application No. PCT/FR2010/052510 dated Apr. 28, 2011.

* cited by examiner

*Primary Examiner* — Nguyen Tran
(74) *Attorney, Agent, or Firm* — Patterson & Sheridan, LLP

(57) ABSTRACT

The converter comprises an inverter and a conversion unit in which a transformer powers a controlled rectifier formed by saturable inductors and power diodes. According to the invention, a series reactive circuit associated with the transformer co-operates with the controlled rectifier for the phase displacement of the voltage applied at the primary of the transformer in relation to the current flowing therethrough. The phase displacement is regulated by a control voltage as a function of the variations in the output voltage of the converter.

19 Claims, 11 Drawing Sheets

DC-DC CONVERTER FOR ELECTRIC POWER USING A DC ELECTRIC POWER SOURCE

The invention relates to a DC-DC converter intended to convert electric power provided by an energy source delivering a first direct voltage and direct current having first respective values into output electric energy at a second direct voltage and with a second direct current having second respective values.

The invention also relates to an electricity distribution facility for consumers distributed in an artificial satellite.

DC-DC converters intended to provide strong currents at low voltages are already known the state of the art. They are in particular used to power satellites and other similar electricity-consuming devices and often comprise a magnetic regulating device called "magnetic postregulator" by specialists, provided to ensure switching of the current so as to deliver an output current with a regulated voltage and/or current.

In a technical bulletin no. SR-4, published in 1999 by the Company Magnetics, Butler, Pa. 16003, EUA, a DC-DC converter with a magnetic postregulator is described (see FIG. 1 of the appended drawings). It includes an input transducer T receiving, on its primary, a hashed direct current from a direct current source (not shown). The secondary of this transducer powers, by its respective ends, two saturable induction coils $SC_1$ and $SC_2$ connected using diodes $D_1$ and $D_2$ to a smoothing induction coil L also connected to the positive output terminal B+ of the converter.

The negative output terminal B− is connected to a middle connector PM of the transducer T. A regulator R producing a voltage reference on a reference point PR injects a correction signal on a line LC in the rectifier circuit CR formed by the induction coils $SC_1$ and $SC_2$ and the diodes $D_1$ and $D_2$ by means of two additional diodes d1 and d2 that are respectively connected to the junction points between the induction coil $SC_1$ and the diode $D_1$ on the one hand and the induction coil $SC_2$ and the diode $D_2$ on the other.

The assembly also includes a "free wheel" diode $D_3$ connected between the node of the diode $D_1$ and the induction coil L and the negative output terminal B− of the converter.

This known converter with a magnetic postregulator works suitably by switching due to the saturation of the induction coils $SC_1$ and $SC_2$, but has the drawback of requiring a transducer T with a relatively complex construction, as it is equipped with a secondary made up of two half-windings, and above all a "free wheel" diode $D_3$. The latter introduces switching energy dissipation related to the charges accumulated by its parasitic capacity. Furthermore, the regulator R is intended to control the output voltage through a modification of the cyclic ratio of the switching done in the converter.

Known from Japanese patent JP2001 275 361 is another type of DC/DC converter, an overview diagram of which is shown in FIG. 2 of the appended drawings. In that case, an input transducer Ta is used whereof the secondary does not comprise a middle connector. This secondary powers two saturable induction coils $SC_{1a}$ and $SC_{2a}$ that are connected to a positive output terminal Ba+ by means of respective transistors $TR_1$ and $TR_2$. The terminals of the secondary of the transducer Ta are also connected to smoothing inductors La and Lb whereof the shared node is connected to the negative output terminal Ba− of the converter. The gates of the transistors $TR_1$ and $TR_2$ are respectively connected to switching control circuits $CC_1$ to $CC_4$ that receive their input signals from the terminals of the secondary.

This known converter constitutes a current doubler with a synchronous rectifier and uses active components to obtain the switching. The saturable induction coils $SC_{1a}$ and $SC_{2a}$ here serve to perform, by compensating spikes, gentle switching of the active components without themselves participating in the determination of the switching. Furthermore, the output voltage is equal to half the output voltage of the transducer $T_a$ and this ratio is fixed and not regulated. This therefore involves a converter which, although having an input transducer with a single secondary, requires the use of active components and their control circuits such that this converter is ultimately more complex than that of the prior art document previously analyzed. Furthermore, in considering the preferred field of application of the present invention, the presence of active components introduces an operating insecurity factor due to the risks of breakdown that are inherent to the use of such components. The assembly is therefore less suitable for use in an application requiring faultless reliability, for example as a power supply for a satellite.

The invention aims to provide a DC/DC converter with a regulated output without active components, and in particular a "free wheel" diode, a transducer with a divided secondary.

The invention therefore relates to a DC-DC converter intended to convert the electricity provided by an energy source delivering a first direct voltage and a first direct current having first respective values into output electricity at a second direct voltage and a second direct current having second respective values, said converter including an inverter powered by said energy source and intended to create alternative energy at a third voltage and with a third current, a conversion unit intended to deliver said output energy, and a regulator associated with said conversion unit to regulate said second voltage, said conversion unit having a transducer powered by said inverter and feeding into a controlled rectifier intended to provide said second voltage, said controlled rectifier including two serial circuits with opposite conduction directions each made up of a power diode and a saturable induction coil, said saturable induction coils magnetically controlling, during each cycle of the third voltage delivered by said inverter, the beginning- and end-of-conduction moments of said power diodes, and said regulator being connected to analyze said second voltage of said output energy and, as a function of that analysis, to create a control voltage intended to regulate said second voltage, said controlled rectifier also including two regulating diodes connected to inject said control voltage respectively into the connection nodes between the power diode and the saturable induction coil of said serial circuits of said controlled rectifier, said converter being characterized in that it also includes a reactive serial circuit associated with said transducer and cooperating with said controlled rectifier to phase-shift said third voltage relative to said third current, and in that said control voltage regulates the phase shift between them as a function of the alternatives of said second voltage.

Owing to these features, it becomes possible to design DC-DC converters without "free wheel" diodes or switching transistors, while having a completely controlled stable operation.

According to other advantageous features of the invention:
said reactive serial circuit comprises an inductance mounted between said inverter and said transducer;

said reactive circuit is realized in said transducer, which to that end has a significant leakage inductance between its primary and its secondary, weakly coupled to one another;

said reactive serial circuit has an inductance and a capacitance mounted in series between said inverter and said transducer;

at least part of said reactive serial circuit is formed by the cabling connecting said inverter to said transducer;

said transducer can include a secondary made from two half-windings strongly coupled to one another and each powering one of the serial circuits of a power diode and a saturable induction coil, said second voltage being taken between the middle point between the half-windings of said secondary and the node between said power diodes;

said controlled rectifier is mounted as a voltage doubler;

said transducer has a secondary whereof one of the terminal is connected to said serial circuits of a power diode and a saturable induction coil, and whereof the other terminal is connected to each of said diodes by means of a capacitor.

Furthermore, in the case where the rectifier is mounted as a voltage doubler, said reactive serial circuit comprises an inductance mounted between the secondary of the transformer and said voltage doubler;

said reactive circuit comprises an inductance and a capacitance mounted in series between the secondary of said transducer and said voltage doubler; or said reactive circuit is realized in said transducer owing to a distribution by construction between the primary and the secondary thereof.

The invention also relates to an electricity distribution facility, in particular for satellites, characterized in that it includes a DC-DC converter as defined above, built with a plurality of conversion units each connected to said inverter by means of an individual cabling, each of said conversion units comprising its own voltage regulator.

This facility can also be designed so as to include a DC-DC converter as defined above, built with a plurality of conversion units, said conversion units being distributed in groups of at least three units whereof the outputs are placed in parallel and which are connected to said inverter by a multi-line cable.

In that case, in each of said groups of conversion units, they may be connected in a triangle and/or in a star and/or may be regulated by a shared single regulator.

The electricity distribution facility can also be designed to include a converter as defined above and built with a plurality of conversion units powered by a shared transducer including a plurality of secondaries at a rate of one per unit. In that case, each of said conversion units may be provided with its own regulator.

Lastly, according to one advantageous embodiment, the electricity distribution facility, in particular for satellites, is characterized in that it includes a converter as defined above built with a plurality of conversion units arranged in at least one group of conversion units powered by means of a shared transducer connected by its primary to said inverter and including as many secondaries as there are conversion units in a group, one of said conversion units of a group being a pilot conversion unit formed by a symmetrical rectifier with no phase shift means, said inverter being adjustable, the facility including an adjustment loop acting on said inverter to adjust it as a function of the difference signal between a voltage reference signal and a signal depending on the output voltage of said pilot conversion unit, and the other conversion units of a group being provided with their own regulator.

The invention is described in more detail relative to example embodiments and in reference to the drawings.

FIGS. 1 and 2, already described, show DC/DC converter diagrams of the state of the art;

Figure 3:
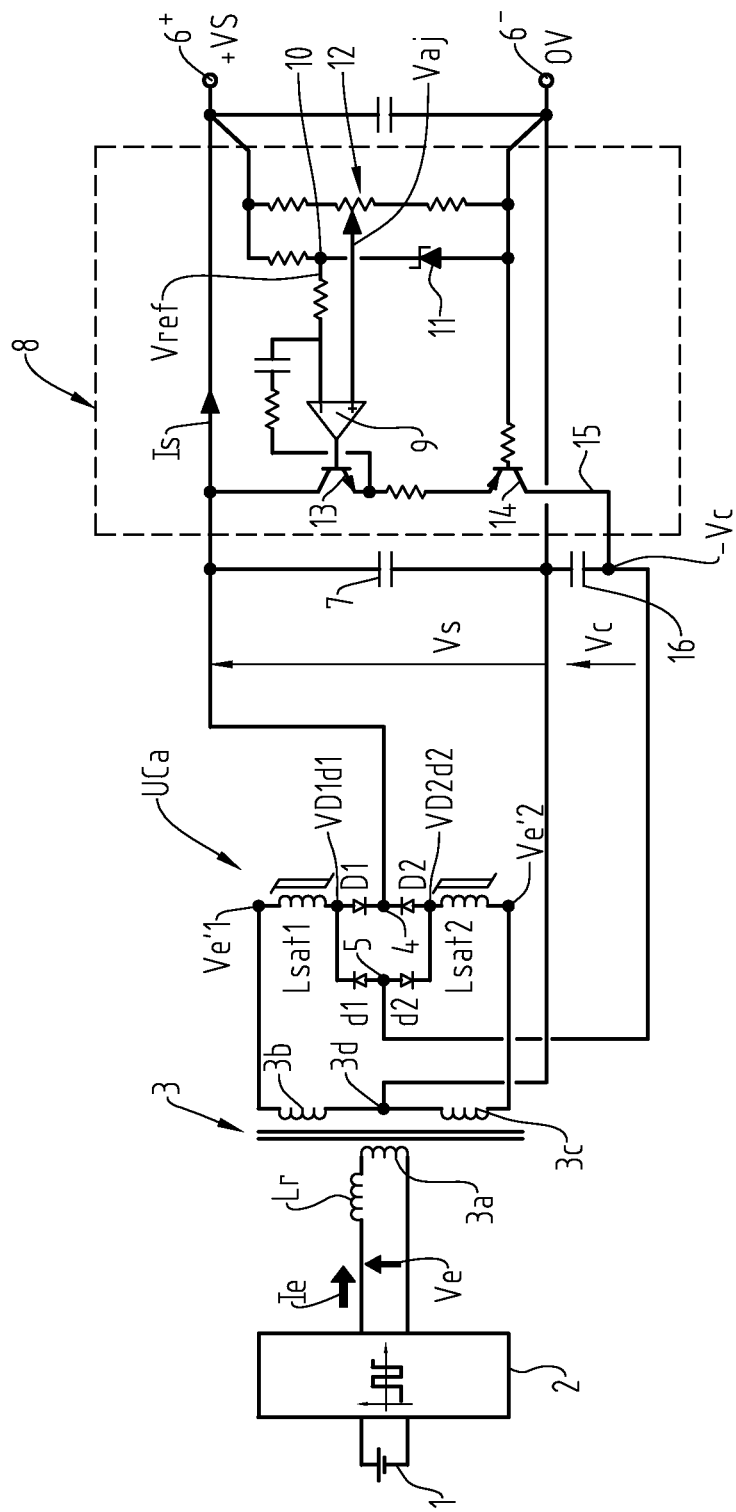
FIG. 3 shows a diagram of one preferred embodiment of the DC/DC converter according to the invention.
Figure 7:
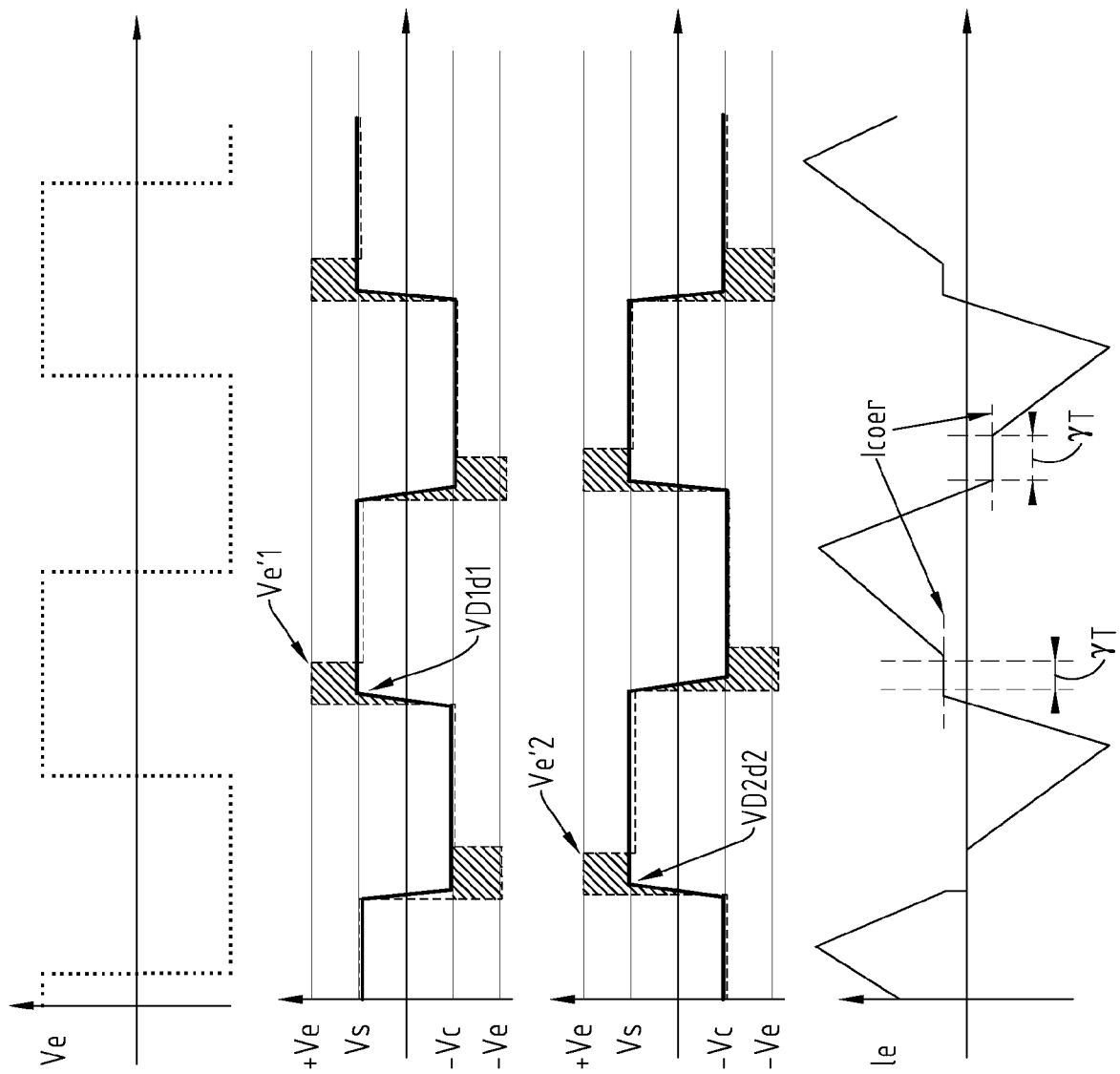
Figure 8:
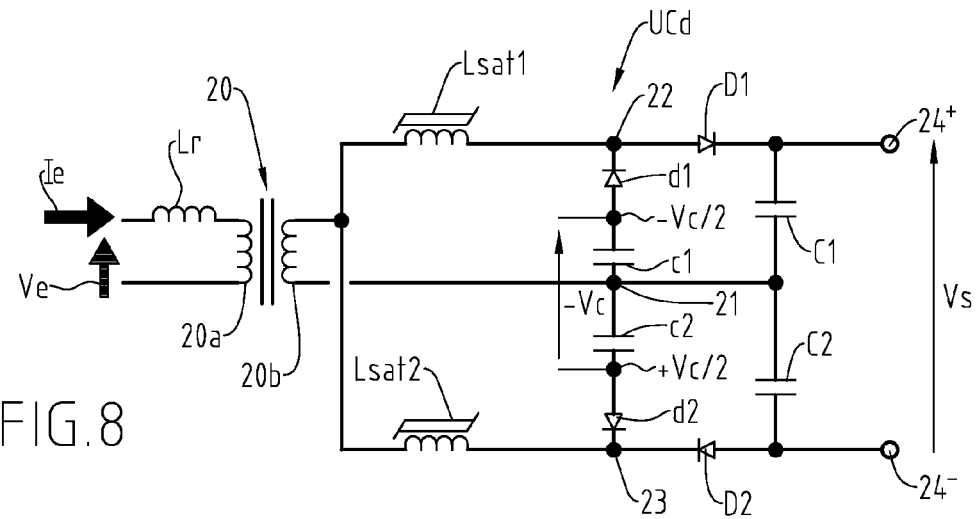
Figure 9:
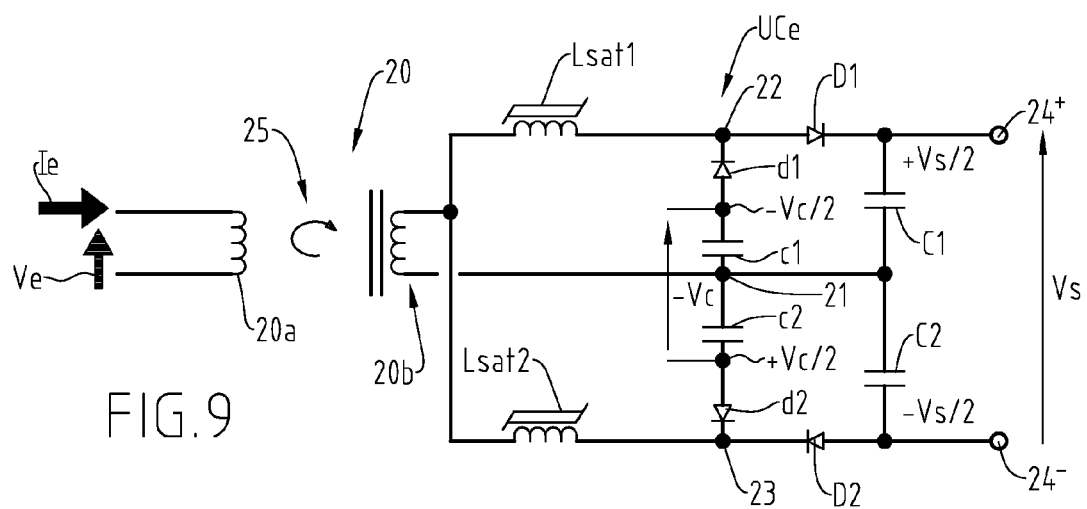
Figure 10A:
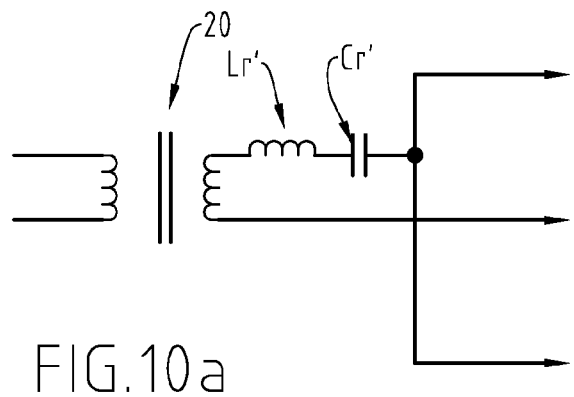
Figure 10B:
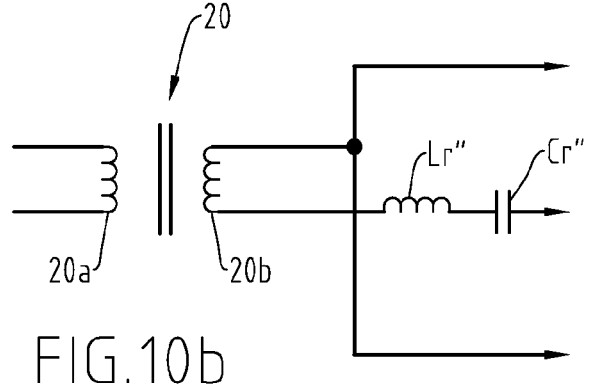
Figure 10:
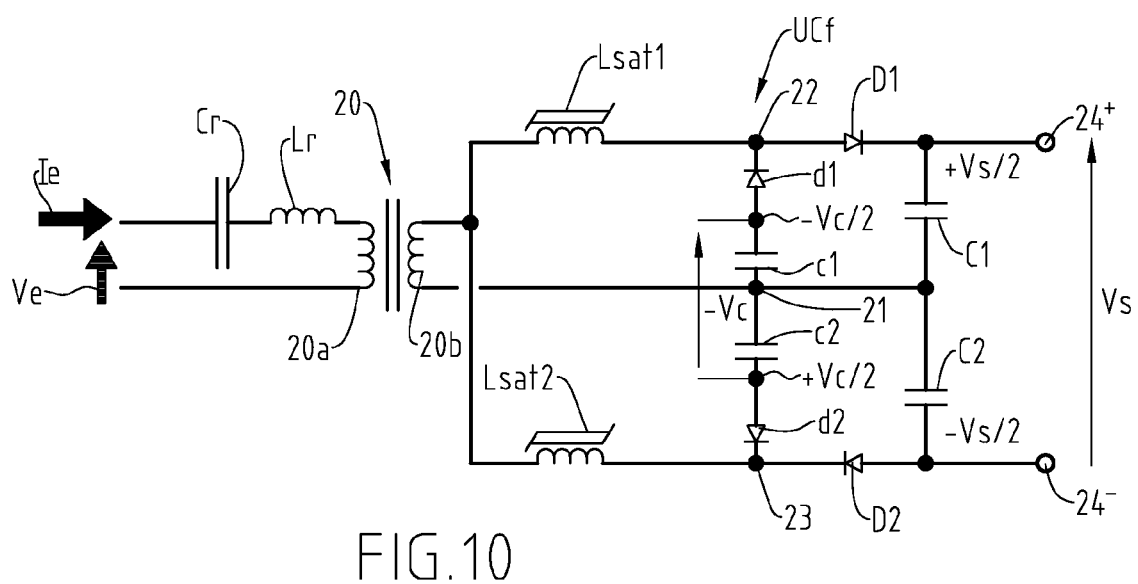
Figure 11:
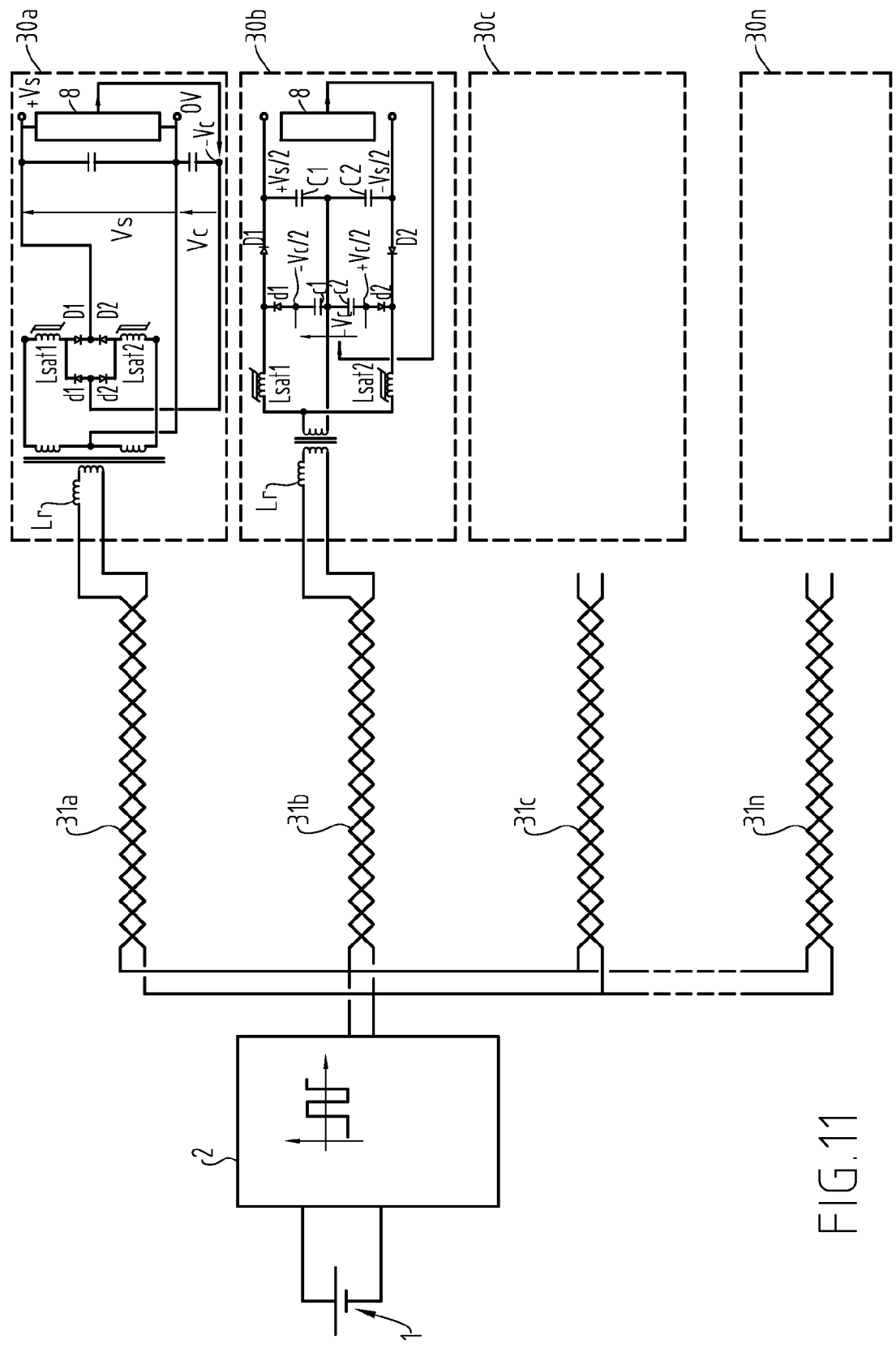
Figure 12:
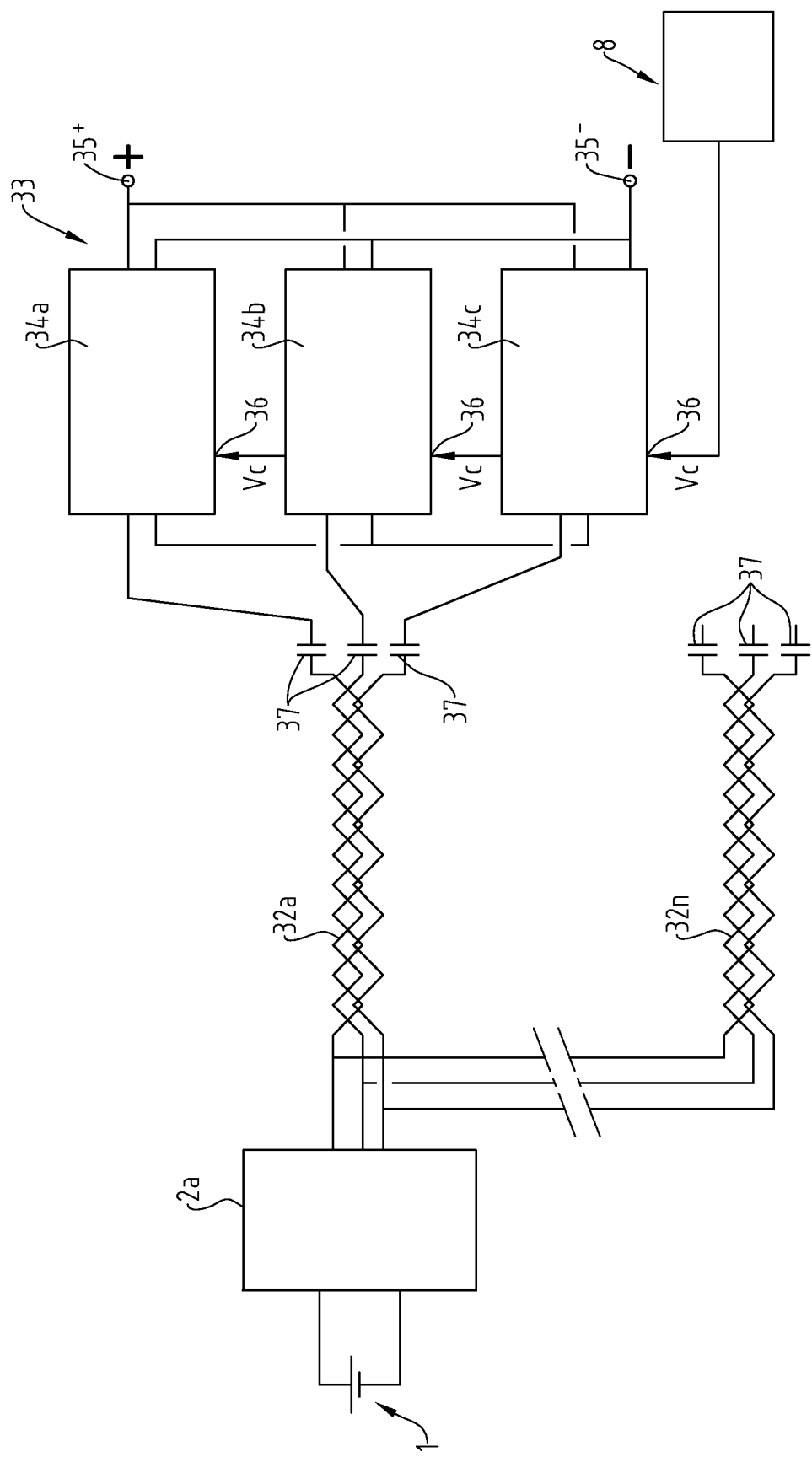
Figure 13:
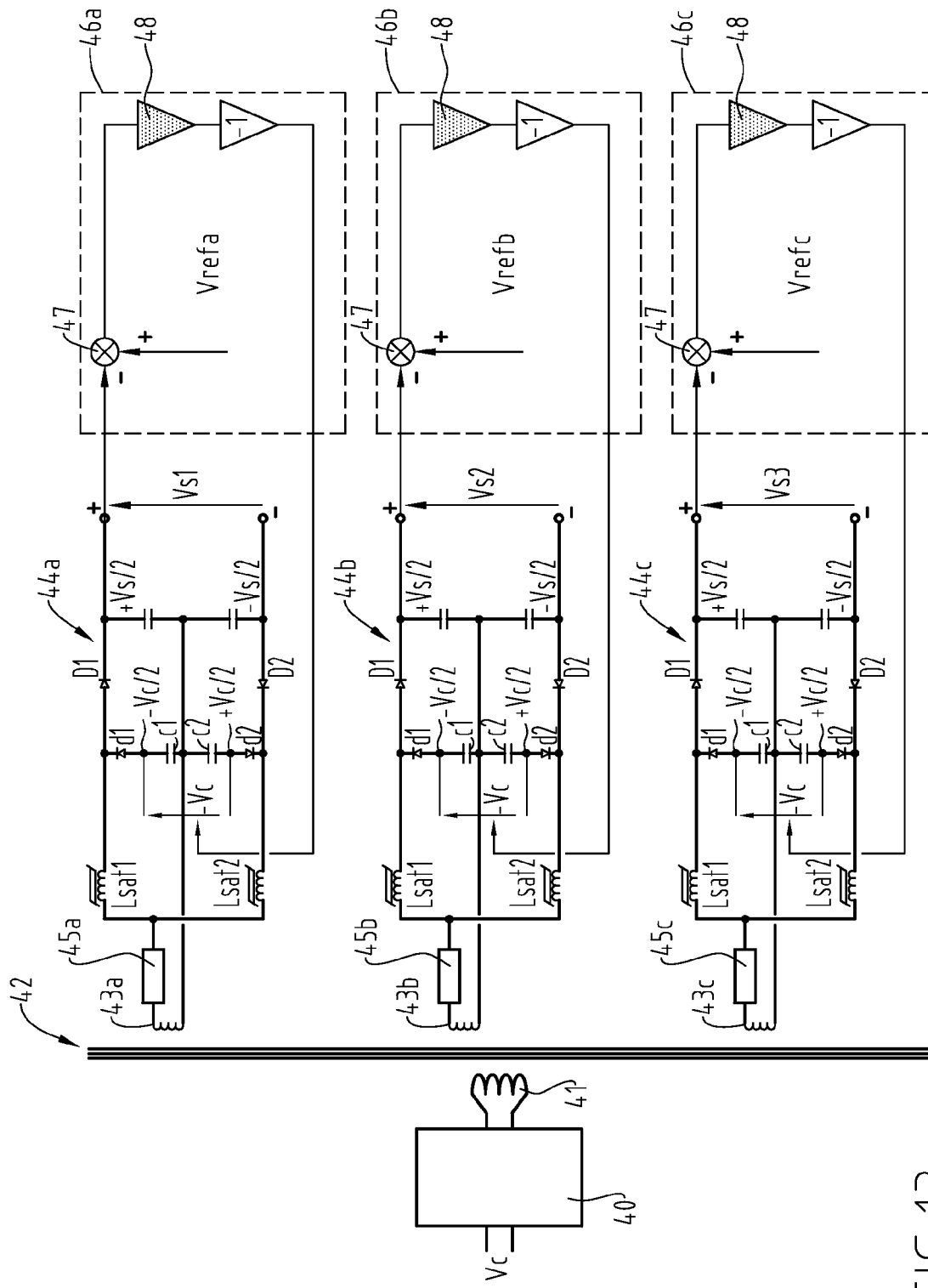
Figure 14:
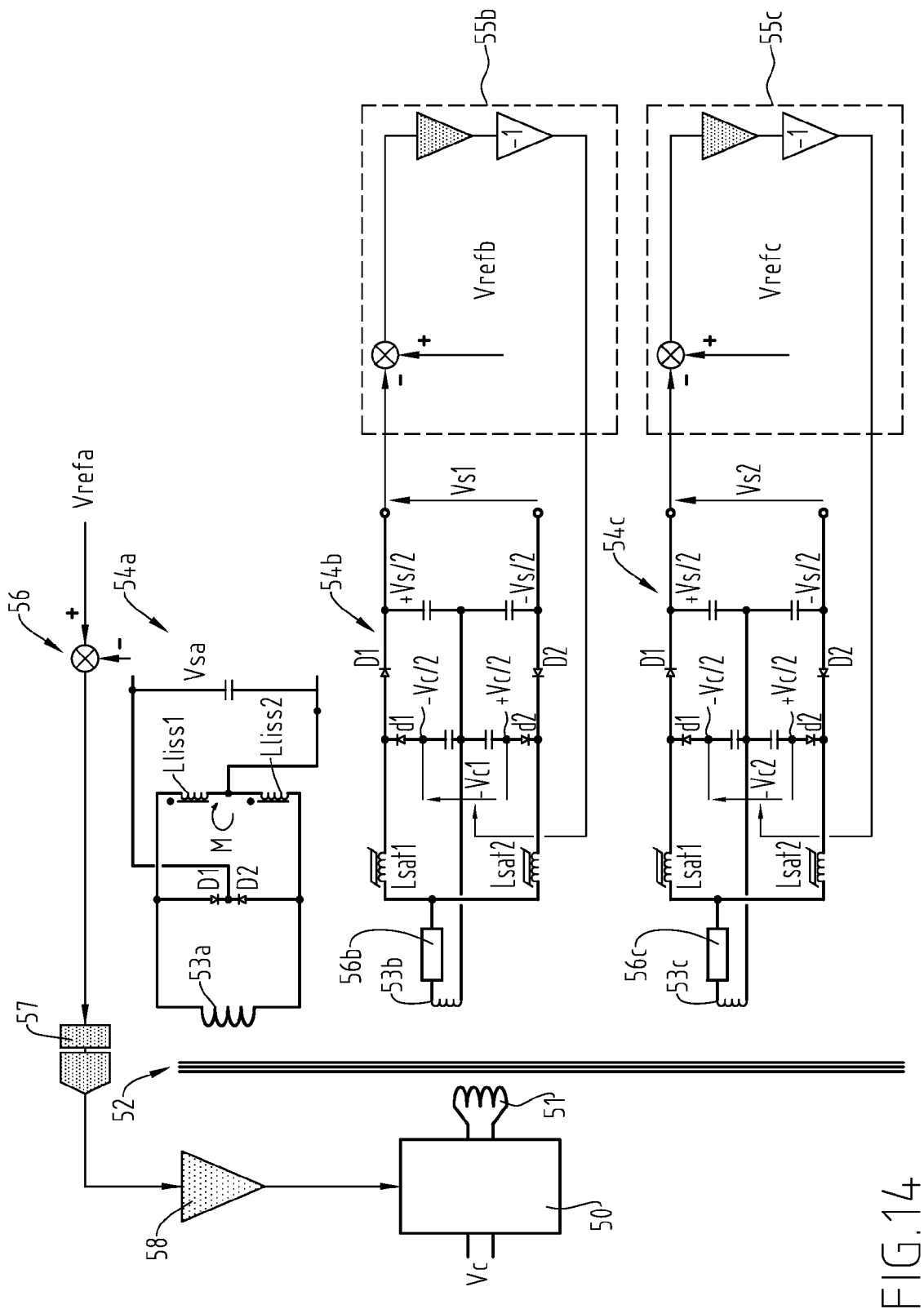

FIG. 7 further illustrates the operation of the converter of FIG. 3;

FIGS. 8, 9 and 10 show three other alternatives of conversion units that can be used in the converter according to the invention, said units being designed according to the voltage doubler principle;

FIGS. 8a, 8b, 10a and 10b show alternative embodiments of the converters respectively shown in FIGS. 8 and 10;

FIG. 11 shows an electricity distribution facility, in particular for telecommunications satellites, including a converter according to the invention with a plurality of conversion units of the type shown in FIG. 3 or in FIG. 8, the conversion units being connected individually to the inverter of the converter;

FIG. 12 is a diagram similar to that of FIG. 11, and shows an electricity distribution facility in which the converter includes a polyphase, more specifically three-phase, inverter powering a plurality of groups of conversion units connected according to a three-phase diagram, here in a star;

FIG. 13 shows the diagram of an electricity distribution facility according to the invention, with three conversion units each provided with its own regulator for the output voltage; and FIG. 14 is a diagram of an electricity distribution facility according to the invention, having three conversion units and provided with a global regulating device combined with individual regulators for the conversion units.

Reference will first be made to FIG. 3, which shows the preferred embodiment of the invention. In this case, the DC/DC converter is powered from a direct current source 1, for example the primary power bar in the case of a telecommunications satellite. This source 1 powers a symmetrical alternating voltage inverter 2 whereof the output is connected to an AC-DC conversion unit $UC_a$ sometimes called "symmetrical postregulator" by specialists. This conversion unit $UC_a$ includes a transducer 3 equipped with a primary $3_a$ and a secondary 3, here having two half-windings $3_b$ and $3_c$ strongly coupled at a middle point $3_d$.

The primary $3_a$ of the transducer 3 is connected to the output of the inverter 2 by means of a serial reactive circuit formed, in this example, by an inductance $L_r$. The resonance frequency of this circuit is preferably lower than the operating frequency of the converter. $I_e$ will refer to the input current sent into the inductance $L_r$ and $V_e$ designates the input voltage applied to the conversion unit $UC_a$ connected to the inverter 2.

The terminals of the half-windings $3_b$ and $3_c$ opposite the middle point $3_d$ are connected to respective saturable induction coils $L_{sat1}$ and $L_{sat2}$. These are connected to one another by means of a serial circuit with two head-to-tail power diodes $D_1$ and $D_2$ shunted by a serial circuit of two other head-to-tail regulating diodes $d_1$ and $d_2$ respectively mounted in opposite directions relative to the latter. The node 4 designates the junction point between the diodes $D_1$ and $D_2$, and node 5 designates the junction point between the diodes $d_1$ and $d_2$. The circuit described above forms a controlled rectifier, the control being done in the manner described below.

The node 4 is connected to the positive output terminal 6+ of the converter, the negative terminal 6− (here at 0 V) of the latter being connected to the middle point $3_d$ of the secondary of the transducer 3. Output voltage $V_s$ designates the voltage prevailing between the terminals 6+ and 6−.

A capacitor 7 is connected between the output terminals 6+ and 6−.

The converter also includes a regulator 8 intended to keep the output voltage $V_s$ constant as a function of the charge applied to the converter.

This regulator 8 includes an operational amplifier 9 whereof the inputs respectively receive a voltage reference $V_{ref}$ established on a node 10 by a Zener diode 11, and an adjustment voltage $V_{aj}$ coming from an adjustable voltage divider 12. The output of the amplifier 9 controls a transistor 13 setting, with another transistor in series 14, a control voltage $-V_c$ appearing on the output terminal 15 of the regulator 8 connected to the node 5 between the regulating diodes $d_1$ and $d_2$. This point is also connected to the node 4 between the power diodes $D_1$ and $D_2$ by means of a capacitor 16. In this embodiment, the control voltage $-V_c$ is referenced relative to the potential of the negative output terminal 6−. According to one alternative not shown, the control voltage may also be referenced at the positive terminal of the converter.

Figure 4:
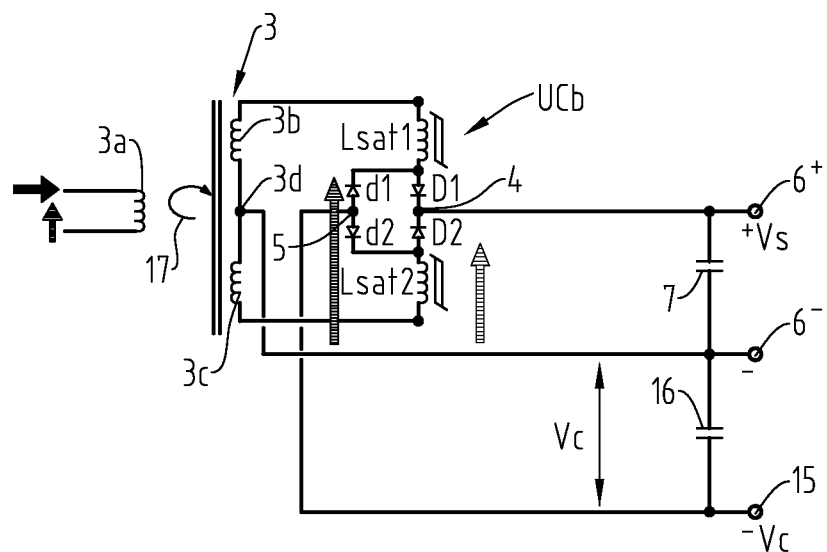
FIGS. 4 and 5 show two alternatives of a conversion unit that can be used in the converter shown in FIG. 3.

FIG. 4 shows an alternative of a conversion unit $UC_b$ according to the invention, the diagram of the regulator 8 not being shown. In that case, the functionality of the serial reactive circuit is realized in the transducer 3 itself, which then has a significant leakage inductance (obtained by a weak coupling symbolized by the arrow 17) between the primary $3_a$ and the half-windings $3_b$ and $3_c$ of the secondary of said transducer. This leakage inductance serves as the inductance belonging to the reactive circuit.

Figure 5:
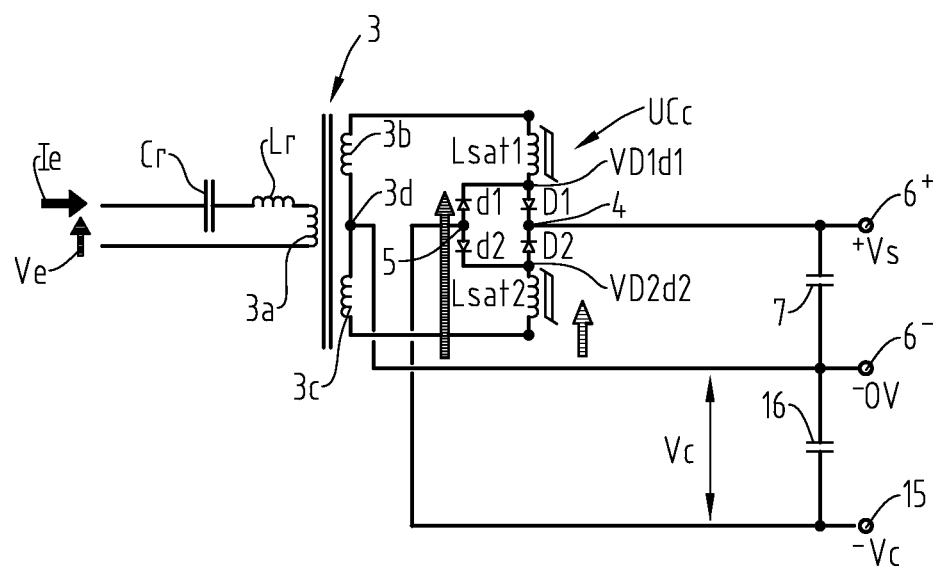

FIG. 5 shows another alternative of a conversion unit $UC_c$ in which the transducer 3 is arranged like that of FIG. 3, the inductance $L_r$ in that case being connected in series with a capacitive component $C_r$.

The assemblies according to the invention described above in reference to FIGS. 3 to 5 all perform a phase shift δ between the input current $I_e$ and the input voltage $V_e$ so as to allow the output voltage $V_s$ to be regulated.

Figure 6:
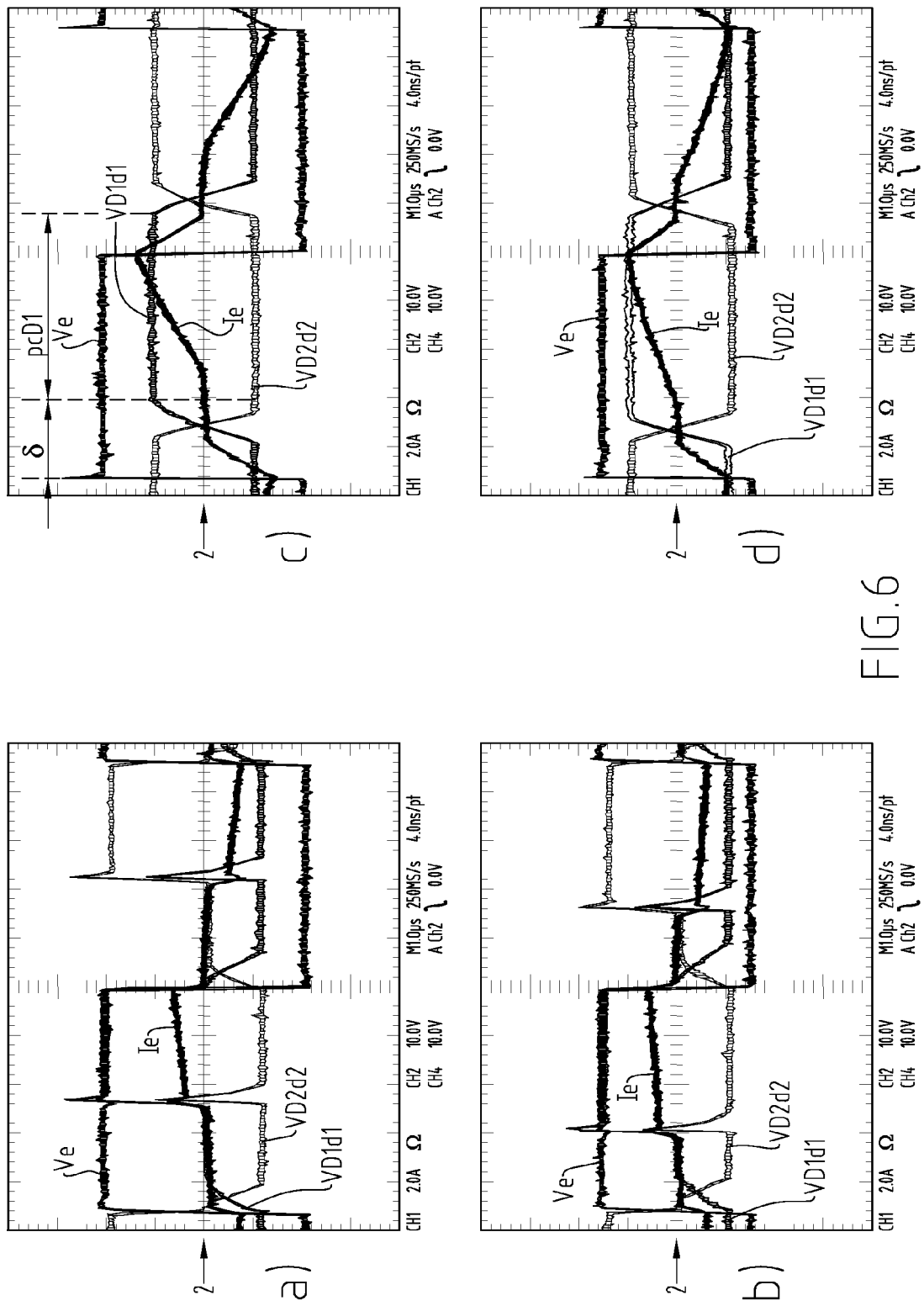
FIG. 6 illustrates the operation on the one hand of the converter of the prior art of FIG. 1 in diagrams a) and b), and on the other hand of the converter of FIG. 3 in diagrams c) and d)

In order to illustrate the operation of the converter according to the invention and show the differences relative to the converters of the prior art, FIG. 6 shows two curves measured on the one hand on a traditional converter of the type commonly called symmetrical "push-pull" or "forward" with magnetic regulation by specialists (FIG. 1; diagrams a) and b) of FIG. 6), and on the other hand on a converter according to the invention, like that shown in FIG. 3 (diagrams c) and d) of FIG. 6).

In the case of diagrams a) and c), the input voltage $V_e$ is 20 V, the output voltage $V_s$ is +10 V, and the control voltage $V_c$ is −10 V. In the case of diagrams b) and d), these values are respectively 15 V, +10 V and −10 V. In each diagram, the curves shown, read on experimental assemblies by the Applicant, are respectively, in decreasing order by shades of gray, the input current $I_e$, the input voltage $V_e$, the voltage $V_{D1d1}$ on the node situated between the power diode $D_1$ and the regulating diode $d_1$, and the voltage $V_{D2d2}$ on the node situated between the power diode $D_2$ and the regulating diode $d_2$.

Figure 1:
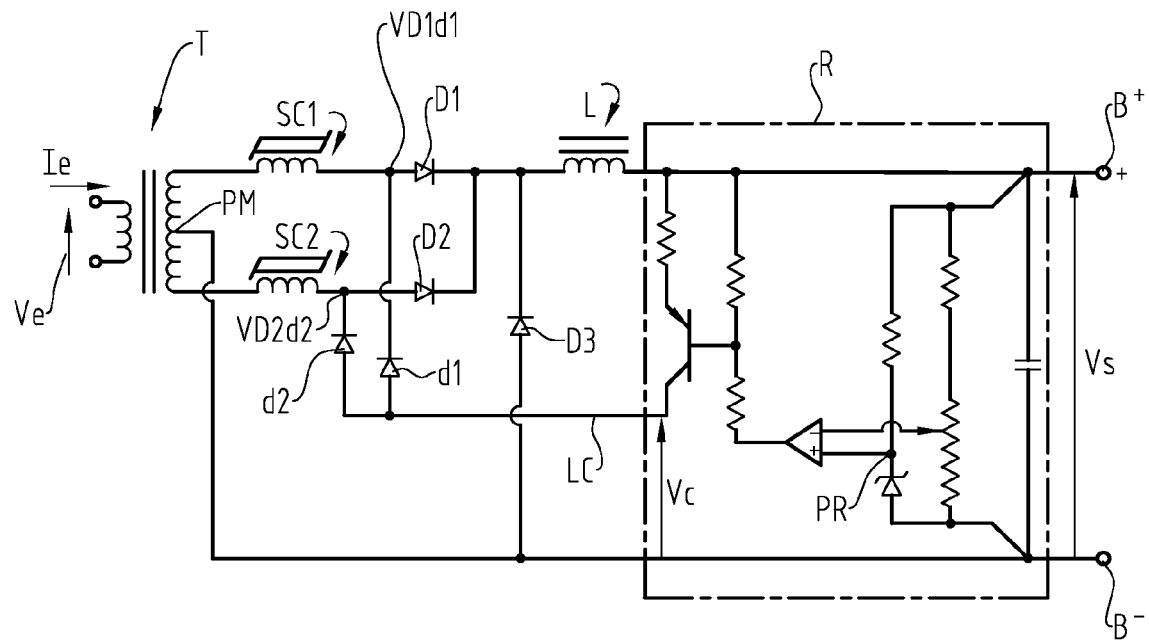
Figure 2:
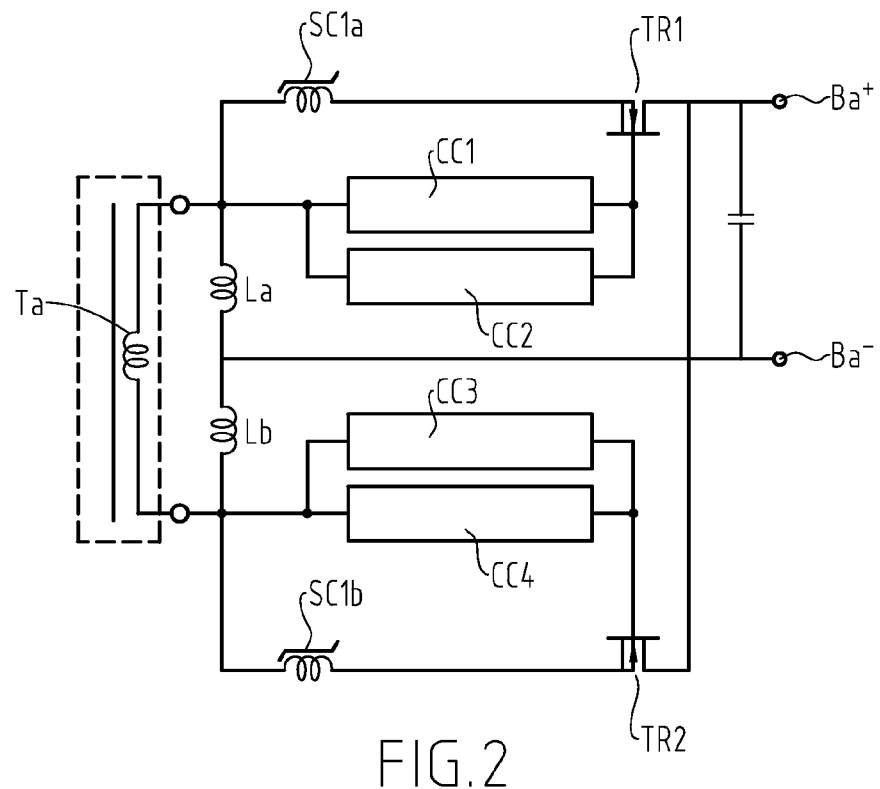

In the traditional converter of FIG. 1, the conduction of the diodes $D_1$ and $D_2$ occurs with a delay relative to the increase in voltage due to the fact that only the saturable induction coils $SC_1$ and $SC_2$ must saturate. Furthermore, the end of conduction of the diodes $D_1$ and $D_2$ occurs when the voltage reverses. While the diodes conduct, the current traveling through them is constant (assuming that the induction coils are perfect) or nearly constant. When the voltage reverses, the current traveling through the diodes drops sharply to zero. It will also be noted that the regulation of the output voltage $V_s$ is obtained by imposing a variation of the cyclic ratio of the input voltage $V_e$ and the input current $I_e$. Lastly, in the case of FIG. 1, a "freewheel" diode $D_3$ must be used so as to force the end of conduction of the diodes $D_1$ and $D_2$.

However, in looking at diagrams c) and d) of FIG. 6, which apply to alternatives of the circuit shown in FIGS. 3, 4 and 5, the following operation can be observed.

The voltages $V_{D1d1}$ and $V_{D2d2}$ evolve between the voltage $V_s$ and the voltage $-V_c$ with a constant cyclic ratio close to 1/2 and having a phase shift δ relative to the voltage $V_e$, which means that the conduction of the power diodes is rigorously phase-shifted relative to the alternating voltage $V_e$, contrary to the traditional assembly, where it is the cyclic ratio that varies. The conduction period $pc_{D1}$ of the diode $D_1$ as well as the phase shift δ are indicated in diagram c) of FIG. 6. The conduction of the power diodes $D_1$ and $D_2$ also occurs with a delay relative to the voltage increase due to the saturation phenomenon of the saturable induction coils $L_{sat1}$ and $L_{sat2}$.

However, the end of conduction of the diodes $D_1$ and $D_2$ occurs when the current of the resonance induction coil disappears, that current beginning to reduce as of the moment when the voltage reverses. This operating difference relative to the traditional circuit is due to the presence of current phase shift means associated with the transducer 3, whether in the form of the resonant circuit (induction coil $L_r$, FIG. 3), the inductance transducer with significant leakage (reference 17, FIG. 4), or the induction coil $L_r$ combined with the capacitance $C_r$ (FIG. 5).

As a result of this operation of the converters according to the invention, the diodes naturally change from the conducting state to the non-conducting state without the help of a "free wheel" diode, which makes it possible to eliminate the latter and thereby eliminate the switching losses and transmission of parasites related to the operation of such a diode. Furthermore, the regulation of the output voltage $V_s$ is done not by modifying the cyclic ratio of the currents, but by varying the phase shift δ thereof relative to the voltage initiated by the phase shift means associated with the transducer 3.

FIG. 7 uses stylized theoretical curves to show the evolution of the voltages at the terminals of the saturable induction coils $L_{sat1}$ and $L_{sat2}$ making it possible to deduce the positive and negative flows in those saturable induction coils, said flows F+ and F− having to be equal over a cycle respectively corresponding to the following two relationships:

$$F^+ = \gamma T^*(V_e - V_s) \text{ and } F^- = \gamma T^*(V_e - V_c)$$

in which γT represents the duration of the time interval during which the saturable induction coils conduct the coercitive current $I_{coer}$ assuming that the transformation ratio is equal to 1. For other values of the transformation ratio, it naturally causes the size $V_e$ to be multiplied by that ratio.

Here, the phase shift depends on the charge, as well as other parameters. However, the output voltage is theoretically related to the control voltage by the equation $V_s = V_c$, which remains globally verified in the real case where the discharge time of the capacitances of the diodes also comes into play and slightly modifies that behavior.

It should also be noted that in the cases of FIGS. 3 to 5, the maximum power that can be transmitted by the converter will be limited by the value of the serial impedance at the operating frequency according to the relationship:

$$P_{smax} = r * \frac{V_e * V_s}{Z}$$

with $Z = L_r * \omega$ (without capacitance; FIGS. 3 and 4)

with $Z = L_r * \omega - \frac{1}{C_r * \omega}$ (with capacitance; FIG. 5)

wherein r is a constant and ω is the operating frequency of the inverter 2 multiplied by π.

We will now describe three other alternatives of the converter according to the invention in reference to FIGS. 8 to 10. These alternatives of conversion units $UC_d$, $UC_e$ and $UC_f$ are based on the principle of the "voltage doubler" with magnetic regulation by phase shift. They have an operation similar to that of the units respectively shown in FIGS. 3 to 5. Neither the inverter 2 nor the regulator 8 are shown.

In the alternative of FIG. 8, the conversion unit $UC_d$ includes a serial reactive circuit formed from an inductance $L_r$ connected to the primary $20_a$ of a transducer 20.

One end of the secondary $20_b$ of this transducer 20 is connected to two saturable induction coils $L_{sat1}$ and $L_{sat2}$. The other end of the secondary $20_b$ forms a central node 21 of the conversion unit $UC_d$. Two capacitors $c_1$ and $c_2$ are respectively connected in series with two opposing regulating diodes $d_1$ and $d_2$ to the nodes 22 and 23. These nodes 22 and 23 are respectively connected to the two induction coils $L_{sat1}$ and $L_{sat2}$ and to two power diodes $D_1$ and $D_2$ mounted in opposition relative to one another. These diodes are respectively connected to two capacitors $C_1$ and $C_2$ that are also connected to the central node 21. The nodes between the diodes $D_1$ and the capacitor $C_1$ and that between the diode $D_2$ and the capacitor $C_2$ form the positive 24+ and negative 24− output terminals of the conversion unit $UC_d$. The regulating voltage $-V_c$ is applied here to the terminals of the capacitors $c_1$ and $c_2$ in series, which are connected to the diodes $d_1$ and $d_2$, respectively.

The alternative of the conversion unit $UC_e$ according to FIG. 9 is built in the same way as that of FIG. 8, except that in that case, no serial reactive circuit is provided as in FIG. 8, but rather a transducer 20 with a weak coupling creating a significant inductive leakage in a manner similar to that applied in the case of FIG. 4, this property being symbolized by the arrow 25.

The conversion unit $UC_f$ of FIG. 10 differs from that of FIG. 8 in that the serial reactive circuit upstream of the transducer 21 is made up of an inductance $L_r$ and a capacitance $C_r$.

Figure 8A:
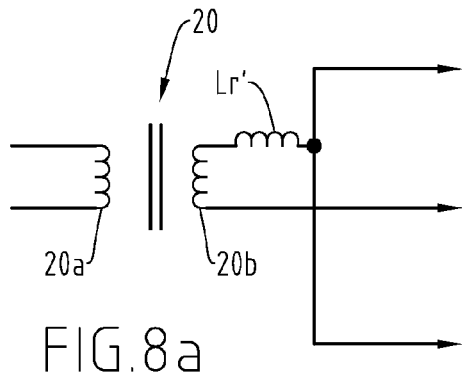
Figure 8B:
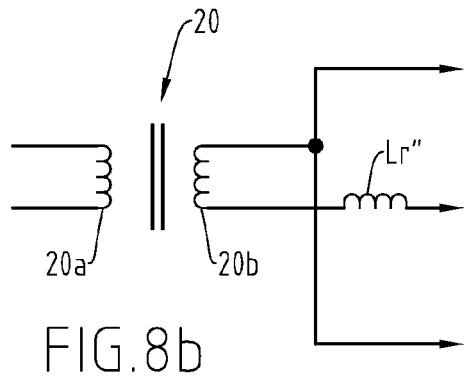

FIGS. 8a and 8b show two alternatives of the arrangement of the resonant circuit of the converter of FIG. 8. In the first case, instead of the impedance $L_r$ mounted in the circuit of the primary $20_a$ of the transducer 20, such an impedance $L_r'$ is provided between the secondary $20_b$ thereof and the saturable induction coils $L_{sat1}$ and $L_{sat2}$ (not drawn here). In the case of FIG. 8b, an induction coil $L_r''$ is provided between the secondary $20_b$ and the node 21 (also not drawn here).

FIGS. 10a and 10b show similar arrangements of the resonant circuit made up of an impedance $L_r'$ or $L_r''$ and a capacitance $C_r'$ or $C_r''$ in this case and mounted on the secondary side of the transducer 20.

According to alternatives that are not shown in the drawings, it is also possible to split the resonant circuit into two parts and to place those parts respectively on either side of the transducer 20. In that case, it may be possible to add a resonance capacitor, which would then be placed in series on the primary side and/or secondary side.

In the case of FIG. 9, the inductance of the reactive circuit is distributed by construction between the primary and secondary of the transducer 20.

FIG. 11 shows a first example of an electricity distribution facility using a plurality of converters built according to any one of the alternatives described above. This facility can for example advantageously be incorporated into a telecommunications satellite, in which the conversion units $30_a$ to $30_n$ are provided as close as possible to the various energy consumers distributed in the satellite. In that case, all of the units $30_a$ to $30_n$ are powered by a shared DC source 1 such as the primary power bar, which may or may not be regulated, of the power sub-system of the satellite feeding into an inverter 2 also shared by all of the units. The latter are then connected in parallel to said inverter 2 using individual bifilar cables $31_a$ to $31_n$ the inductive and/or capacitive properties of which may possibly be exploited.

The facility of FIG. 11 may comprise conversion units of the type of FIG. 3, 4 or 5 or of FIG. 8, 8a, 8b, 9, 10, 10a or 10b, the diagram showing, purely as an example, the use of a conversion unit $30_a$ according to FIG. 3 and a conversion unit $30_b$ according to FIG. 8.

FIG. 12 shows a second example of an electricity distribution facility of the type described above relative to FIG. 11. However, in this case, an inverter $2_a$ is provided that converts the direct current from the source 1 into a three-phase current fed by said inverter into trifilar cables $32_a$ to $32_n$ connected to as many groups 33 of conversion units, whereof only that connected to the cable $32_a$ is shown here. As in the case of FIG. 11, the conversion units can be built according to all alternatives previously described.

The groups of conversion units 33 here are of the three-phase type and therefore have three units each time, $34_a$, $34_b$ and $34_c$, with individual input transducers, not shown, the primaries of which are connected in a star assembly. In both cases, the DC outputs, provided on terminals 35+ and 35− of the conversion units $34_a$, $34_b$ and $34_c$ of each group 33, are connected in parallel, and the control voltage $V_c$ can be produced by a regulator 8 allocated to the group and applying that voltage in parallel to the three units $34_a$ to $34_c$ of the group by means of the terminals 36.

It will also be noted that the trifilar cables $32_a$ to $32_n$ are connected to the primaries of the transducers of the conversion units by means of capacitors 37 that can, if necessary, serve as components for the serial reactive circuits in combination with the inductances formed by the cables $32_a$ to $32_n$.

The alternative described above relative to FIG. 12 can be made in a triangle or possibly in a polyphase version (more than three phases). One skilled in the art will know how to produce such polyphase alternatives by adapting the three-phase version described above accordingly.

The advantages of the three-phase or polyphase alternatives are significant. In fact, a polyphase design of the facility according to the invention makes it possible to increase the power thereof without increasing the unit power of the power components used, such as the diodes, the saturable induction coils and the capacitors. It also makes it possible, at operating frequency and with identical filtering, to reduce the inversion current, compared to the case of a monophase version. This results in a weight, bulk and cost reduction for a given overall power of the facility.

Lastly, a polyphase version has better fault tolerance, since a polyphase facility could still work, albeit in a downgraded mode, with one or more non-functional phases, but without preventing reduced operation of the energy consumers. This may represent a particular advantage in the context of a telecommunications satellite.

FIGS. 13 and 14 show two possible arrangements of the regulation of a conversion facility according to the invention.

In the case of FIG. 13, a non-regulated inverter 40 powers the primary winding 41 of a transducer 42 comprising three secondary windings $43_a$, $43_b$ and $43_c$ in monophase mode. The latter parts are respectively connected to three conversion units $44_a$, $44_b$ and $44_c$ designed according to the principle of FIG. 8, for example.

In that case, impedances $45_a$, $45_b$ and $45_c$, respectively, are inserted between each secondary $43_a$, $43_b$ and $43_c$ and the corresponding conversion unit $44_a$, $44_b$ and $44_c$. Such an impedance can then be formed by a capacitor and an inductance in series, or by an inductance alone.

Each of these conversion units is associated with its own regulator $46_a$, $46_b$ and $46_c$ that can be built like the regulator 8 of FIG. 3, for example. An independent voltage reference $V_{refa}$, $V_{refb}$ and $V_{rec}$, respectively, is applied to each of these regulators, providing a reference for a regulating loop symbolized here by the comparing elements 47 and the amplifiers 48. In this way, each conversion unit regulates its own output voltage as a function of the charges applied to it.

In the case of FIG. 14, the converter includes an inverter 50 that is regulated here. It powers the primary 51 of a transducer 52 having three secondaries $53_a$, $53_b$ and $53_c$ that are respectively connected to three conversion units $54^2$, $54_b$ and $54_c$, the units $54_b$ and $54_c$ being made according to that shown in FIG. 8, for example. These conversion units are associated with regulators $46_a$ and $46_b$ designed like the regulators $46_a$ to $46_c$ of FIG. 13 using the diagram of FIG. 3, for example. These regulators receive the reference voltages $V_{refb}$ and $V_{refc}$.

The conversion unit $54_a$ is a simple symmetrical rectifier without phase shift means and including power diodes $D_1$ and $D_2$ and smoothing induction coils $L_{liss1}$ and $L_{liss2}$. The output voltage $V_{sa}$ of this conversion unit is compared to a reference voltage $V_{refa}$ in a comparing element 56 that creates a regulating signal for the regulated inverter 50 to which it is transmitted by means of a galvanic isolating device 57, such as an opto-coupler, for example, and an error amplifier 58 of the PID type, for example. The output of this amplifier thus forms the voltage reference for the inverter 50.

In the facility according to FIG. 14, the regulation controlling the inverter 50 is done as a function of the variations of the output voltage $V_{sa}$ due for example to the variations of its charge. This regulation controls the operating rating of the inverter 50 so as to "roughly" determine the output voltages of all of the conversion units. The regulations done by the regulators $55_b$ and $55_c$ perform a subtle regulation of the output voltages of the conversion units $54_b$ and $54_c$.

Also in this case, impedances, $56_b$ and $56_c$ respectively, are inserted between the secondaries $53_b$ and $53_c$ and the corresponding conversion unit $54_b$ and $54_c$. Such an impedance can then be formed by a capacitor and an inductance in series, or by an inductance alone.

The regulation solutions shown in FIGS. 13 and 14 have the significant advantage of working without notable energy losses, as opposed to the traditional solutions, in which the output voltages of the converters are generally adjusted using dissipative ballasts.

The invention claimed is:

1. A DC-DC converter intended to convert the electricity provided by an energy source delivering a first direct voltage and a first direct current having first respective values into output energy at a second direct voltage and a second direct current having second respective values, said converter including:
    an inverter powered by said energy source and intended to create alternative energy at a third voltage and with a third current,
    a conversion unit intended to deliver said output energy, and
    a regulator associated with said conversion unit to regulate said second voltage,
    said conversion unit having a transducer powered by said inverter and feeding into a controlled rectifier intended to provide said second voltage,
    said controlled rectifier including two serial circuits with opposite conduction directions each made up of a power diode and a saturable induction coil, said saturable induction coils magnetically controlling, during each cycle of the third voltage delivered by said inverter, the beginning- and end-of-conduction moments of said power diodes, and
    said regulator being connected to analyze said second voltage of said output energy and, as a function of that analysis, to create a control voltage intended to regulate said second voltage, and
    said controlled rectifier also including two regulating diodes connected to inject said control voltage respectively into the connection nodes between the power diode and the saturable induction coil of said serial circuits of said controlled rectifier,
    said converter being wherein it also includes a reactive serial circuit associated with said transducer and cooperating with said controlled rectifier to phase-shift said third voltage relative to said third current, and in that said control voltage regulates the phase shift between them as a function of the alternatives of said second voltage.

2. The DC-DC converter according to claim 1, wherein said reactive serial circuit comprises an inductance mounted between said inverter and said transducer.

3. The DC-DC converter according to claim 1, wherein said reactive serial circuit is realized in said transducer, which to that end has a significant leakage inductance between its primary and its secondary, weakly coupled to one another.

4. The DC-DC converter according to claim 1, wherein said reactive serial circuit comprises an inductance and a capacitance mounted in series between said inverter and said transducer.

5. The DC-DC converter according to claim 2, wherein at least part of said reactive serial circuit is formed by the cabling connecting said inverter to said transducer.

6. The DC-DC converter according to claim 1, wherein said transducer includes a secondary made from two half-windings strongly coupled to one another and each powering one of the serial circuits of the power diode and the saturable induction coil, and in that said second voltage is taken between a middle point between the two half-windings of said secondary and a node between said power diodes.

7. The DC-DC converter according to claim 1, wherein said controlled rectifier is mounted as a voltage doubler.

8. The DC-DC converter according to claim 7, wherein said transducer has a secondary whereof one terminal is connected to said serial circuits of the power diode and the saturable induction coil, and wherein a capacitor is connected between each of said power diodes and another terminal of the secondary.

9. The DC-DC converter according to claim 7, wherein said reactive serial circuit comprises an inductance mounted between the secondary of the transformer and said voltage doubler.

10. The DC-DC converter according to claim 7 wherein said reactive circuit comprises an inductance and a capacitance mounted in series between the secondary of said transducer and said voltage doubler.

11. The DC-DC converter according to claim 3, wherein said reactive circuit is realized in said transducer due to a construction between the primary and the secondary thereof, a resonance capacitance placed in series on the primary side and/or secondary side, and wherein said controlled rectifier is mounted as a voltage doubler.

12. An electricity distribution facility, wherein it includes a DC-DC converter according claim 1, built with a plurality of conversion units each connected to said inverter by means of an individual cabling, and in that each of said conversion units comprises its own voltage regulator.

13. An electricity distribution facility, wherein it includes a DC-DC converter according to claim 1, built with a plurality of conversion units, said conversion units being distributed in groups of at least three units whereof the outputs are placed in parallel, and in that the conversion units of each of said groups are connected to said inverter by a multi-line cable.

14. The electricity distribution facility according to claim 13, wherein in each of said groups of conversion units said conversion units are connected in a triangle or in a star.

15. The electricity distribution facility according to claim 13, wherein in each of said groups of conversion units, said conversion units are regulated by a shared single regulator.

16. An electricity distribution facility, wherein it includes a converter according to claim 9, built with a plurality of conversion units powered by a shared transducer including a plurality of secondaries at a rate of one per unit.

17. The distribution facility according to claim 16, wherein each of said conversion units is provided with its own regulator.

18. An electricity distribution facility, wherein it includes a converter according to claim 9, built with a plurality of conversion units arranged in at least one group of conversion units powered by means of a shared transducer connected by its primary to said inverter and including as many secondaries as there are conversion units in a group,
   in that one of said conversion units of a group being a pilot conversion unit formed by a symmetrical rectifier with no phase shift means,
   in that said inverter is adjustable,
   in that the facility includes an adjustment loop acting on said inverter to adjust it as a function of the difference signal between a voltage reference signal and a signal depending on the output voltage of said pilot conversion unit, and
   in that the other conversion units of a group being provided with their own regulator.

19. The DC-DC converter according to claim 8, wherein each of said power diodes is directly connected to a capacitor.

* * * * *